United States Patent
Bernhardt et al.

[11] Patent Number: 5,168,975
[45] Date of Patent: Dec. 8, 1992

[54] MOTOR VEHICLE DRIVE ARRANGEMENT

[75] Inventors: Winfried Bernhardt; Paulus Heidemeyer, both of Wolfsburg; Dag-Arnulf Schlaf, Brunswick, all of Fed. Rep. of Germany

[73] Assignee: Volkswagen AG, Fed. Rep. of Germany

[21] Appl. No.: 783,983

[22] Filed: Oct. 29, 1991

[30] Foreign Application Priority Data

Oct. 29, 1990 [DE] Fed. Rep. of Germany ....... 4034310

[51] Int. Cl.⁵ .................. B60K 41/02; F16D 21/00
[52] U.S. Cl. .................. 192/0.096; 192/0.048; 192/0.098
[58] Field of Search ............ 192/0.048, 0.096, 0.098

[56] References Cited

U.S. PATENT DOCUMENTS

| | | | |
|---|---|---|---|
| 1,239,949 | 9/1917 | Pace | 192/0.096 |
| 1,968,635 | 7/1934 | Coffman | 192/0.098 X |
| 4,255,982 | 3/1981 | Kern | 74/7 R |
| 4,648,496 | 3/1987 | Petzold et al. | 192/0.096 X |
| 4,860,863 | 8/1989 | Hayashi | 192/0.096 X |
| 5,058,716 | 10/1991 | Lippe et al. | 192/3.3 X |

FOREIGN PATENT DOCUMENTS 3703759  9/1987  Fed. Rep. of Germany .

*Primary Examiner*—Leslie A. Braun
*Assistant Examiner*—Nicholas Whitelaw
*Attorney, Agent, or Firm*—Brumbaugh, Graves, Donohue & Raymond

[57] ABSTRACT

A drive arrangement for a motor vehicle has an internal combustion engine, a transmission on the output side of the engine and at least one drive axle, and an arrangement for shutting off and restarting the engine depending upon the driving condition. The transmission is a continuously variable automatic transmission and a disconnect coupling is arranged on the output side of the transmission to prevent transmission losses when the engine is turned off. An electromechanical converter capable of operation as a motor or a generator may be provided in place of a flywheel.

12 Claims, 2 Drawing Sheets

MOTOR VEHICLE DRIVE ARRANGEMENT

BACKGROUND OF THE INVENTION

This invention relates to drive arrangements for motor vehicles.

In order to reduce fuel consumption, it is known to turn off the engine of a motor vehicle and restart the engine again in accordance with particular operating conditions. When the engine is turned off, it is necessary to disconnect the drive train of the vehicle by at least one coupling. Turning off and restarting of the engine, as well as disconnection of the drive train coupling, are monitored by a special device such as an electronic control instrument, and are performed automatically. When this procedure is used in conjunction with a servo-supported, i.e., semiautomatic, stepped-gear transmission, relatively favorable fuel consumption can be obtained, particularly with variable driving conditions. This performance is obtained in part because, when the vehicle is coasting and the engine is turned off, the transmission floats in the idling condition, resulting in low friction losses. The use of a torque-converter automatic transmission, having a fluid coupling to provide greater comfort and a wider range of transmission ratios, has not been considered previously in connection with a motor-disconnecting coupling-transmission-driveshaft drive train because of its rather poor mechanical efficiency. This is because, with that arrangement, the coasting vehicle must drive the transmission with the engine turned off, causing friction or torque converter energy losses.

SUMMARY OF THE INVENTION

Accordingly, it is an object of the present invention to provide a new and improved motor vehicle drive arrangement that overcomes the disadvantages of the prior art.

Another object of the invention is to provide a motor vehicle drive arrangement which provides improvements with respect to fuel consumption and environmental impact in comparison with the above-mentioned prior art drive arrangement.

These and other objects of the invention are attained by providing a motor vehicle drive arrangement having an automatic transmission with a disconnect coupling on the output side of the transmission. Preferably, the automatic transmission has internal controls designed to economize on fuel. The disadvantage of poor efficiency resulting from energy losses occurring in the interior of the automatic transmission is prevented, at least when the engine is turned off, by the disconnect coupling on the output side of the transmission which is opened upon shutdown of the engine so that the transmission is disconnected from the drive axle. In addition, loss-producing components of the transmission, such as the conventional transmission-dependent main oil pump, are simultaneously turned off.

The transmission is advantageously designed as a continuously variable transmission. Continuously variable transmissions, such as cone-pulley transmissions, called CVT's, have been known for some time. They have the advantage of a high transmission ratio spread. Moreover, the continuous adjustability provided by such transmissions permits constant operation at optimum fuel consumption. The combination of a continuously variable transmission with a disconnect coupling on the output side is generally disclosed in German Offenlegungsschrift No. 37 03 759, but that disclosure does not describe the above-mentioned drive arrangement. Instead, that disclosure relates to an arrangement which assures the variability of the transmission when a dry-running transmission belt is used.

In accordance with another aspect of the invention, the drive arrangement includes a centrifugal mass between the engine and the continuously variable transmission which is capable of being disconnected from the transmission by an additional coupling. With this arrangement, starting of the engine is not subjected to mechanical transmission losses. Moreover, the centrifugal mass between the engine and the continuously variable transmission may be disconnectable from the engine by an additional coupling. In this way, the centrifugal mass may be used directly for starting the engine by first bringing the centrifugal mass up to speed without any engine connection and then connecting it to the engine.

The centrifugal mass advantageously constitutes a fly-wheel which may be driven by an electric starter or it may constitute the rotor of an electromechanical converter. In the latter case, an especially compact design is provided. When the electromechanical converter has a fairly heavy-duty construction, hybrid operation of the vehicle in conjunction with the above-mentioned additional coupling is possible.

It is particularly advantageous to provide a control device for the electromechanical converter which controls its operation as a generator or as a motor and which controls the direction of flow of electrical energy between the electromechanical converter and an electrical energy storage device. In this way, the vehicle is able to recover energy by operating the electromechanical converter as a generator during push operation of the vehicle.

According to still another aspect of the invention, a conventional semiautomatic transmission, i.e., a manual transmission with an automatic disconnect coupling, is arranged with the disconnect coupling on the output side of the transmission. In this case as in the other cases mentioned above, energy losses occurring in the transmission are isolated from the drive axle when the engine is turned off so that fuel consumption in variable driving conditions is optimized.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
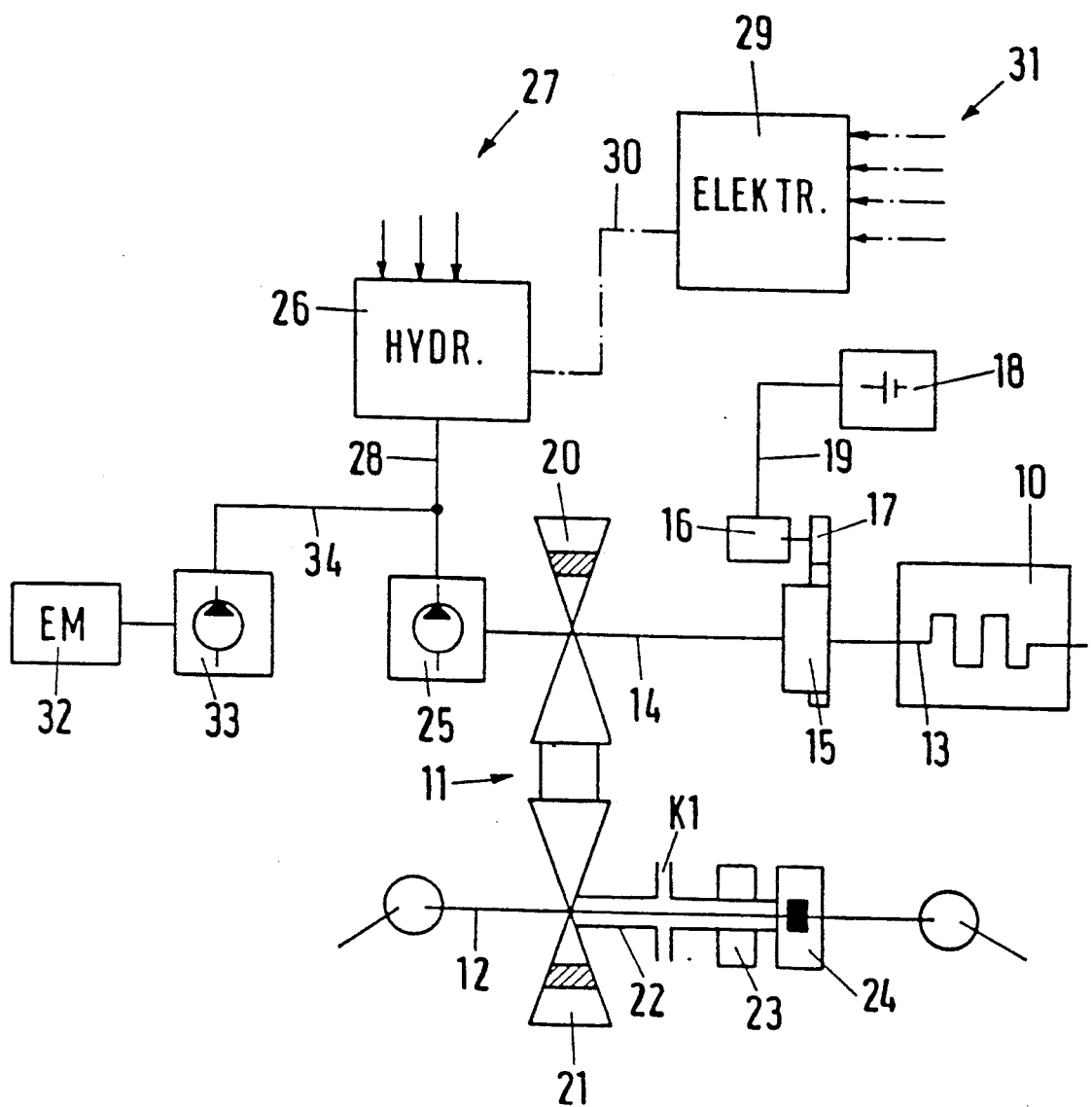
FIG. 1 is a schematic block diagram illustrating a representative embodiment of a drive arrangement for a motor vehicle according to the invention including a continuously variable transmission with a coupling arranged on the downstream side and a flywheel with a starter arranged on the upstream side.

The typical embodiment of a drive arrangement according to the invention shown in FIG. 1 includes a motor 10, shown as an internal combustion engine, a continuously variable transmission 11, which may be a cone-pulley transmission, and at least one driven axle 12. Between an engine crankshaft 13 and a transmission input shaft 14, a flywheel 15 providing a centrifugal mass is mounted, preferably being rigidly connected with both of the shafts 13 and 14. A starter 16 is arranged to drive the flywheel 15 through a pinion 17, if appropriate. The starter 16 draws electrical energy from an electric storage device such as a battery 18 through a power line 19 which connects it to the battery 18.

The transmission 11 has an input cone pulley pair 20 mounted on the transmission input shaft 14 and an output cone pulley pair 21. The cone pulley pair 21 is connected to a transmission output shaft 22 which is a hollow shaft surrounding the drive axle 12. The output shaft 22 includes a planetary gear 23, from which drive energy is transmitted to the drive axle 12 through a differential gear 24. A hydraulic coupling K1, which is actuatable by an auxiliary device, is disposed between the cone pulley pair 21 and the planetary gear 23. If an oil supply is required for the cone-pulley transmission 11 and the coupling K1, this is provided by a main oil pump 25 which is preferably driven by the transmission input shaft 14.

A hydraulic control unit 26 constitutes the actuating means for the coupling K1 as well as other elements. In addition, the control unit 26 effects the adjustment of the cone pulley pairs 20 and 21. The hydraulic lines connecting the control unit to the three elements K1, 20 and 21 are not shown, but are represented symbolically by three arrows 27 at the control unit 26. A hydraulic connection 28 is also provided between the main oil pump 25 and the control unit 26. Operation of the hydraulic control unit 26 is governed by an electronic control unit 29, which also controls all of the other functions of the drive arrangement. A signal line 30 connects the electronic control unit 29 and the hydraulic control unit 26. For the sake of clarity, additional signal lines are not illustrated, but are indicated symbolically as arrows 31 at the control unit 29.

The electronic control unit 29 is arranged to switch the motor 10 on and off automatically as a function of the driving or operating condition of the vehicle. Thus, for example, in push operation, with the motor 10 unloaded, the coupling K1 is first opened and the engine 10 simultaneously turned off. As soon as a driving torque is again required, for example, by actuation of a gas pedal (not shown), the motor 10 is restarted by the starter 16 and the coupling K1 is closed. The transmission ratio of the transmission 11 is automatically controlled by displacement of the cone pulley pairs 20 and 21 as a function of the load on the engine and possibly additional parameters, such as, for example, the vehicle speed and the engine rpm. This ratio is also adjusted so that, upon closing of the coupling K1, any difference between the engine speed and the transmission output shaft 22 is kept as small as possible.

When the engine 10 is turned off, the main oil pump 25, which supplies the pressure required for displacement of the cone pulley pairs 20 and 21 and the coupling, is also off. To ensure sufficient oil pressure in this condition, an auxiliary oil pump 33, driven by an electric motor 32, is connected to the hydraulic line 28 by a line 34. As soon as the pressure in the hydraulic system has fallen below a given minimum, the auxiliary oil pump 33 starts. Since in principle no displacement of the cone pulley transmission 11 is required when the motor is turned off, at least until shortly before closing of the coupling K1, the auxiliary oil pump 33 may be small. Actuation of the coupling K1 during the starting process is effected with a time delay or as a function of the threshold value of the pressure in the hydraulic system.

Figure 2:
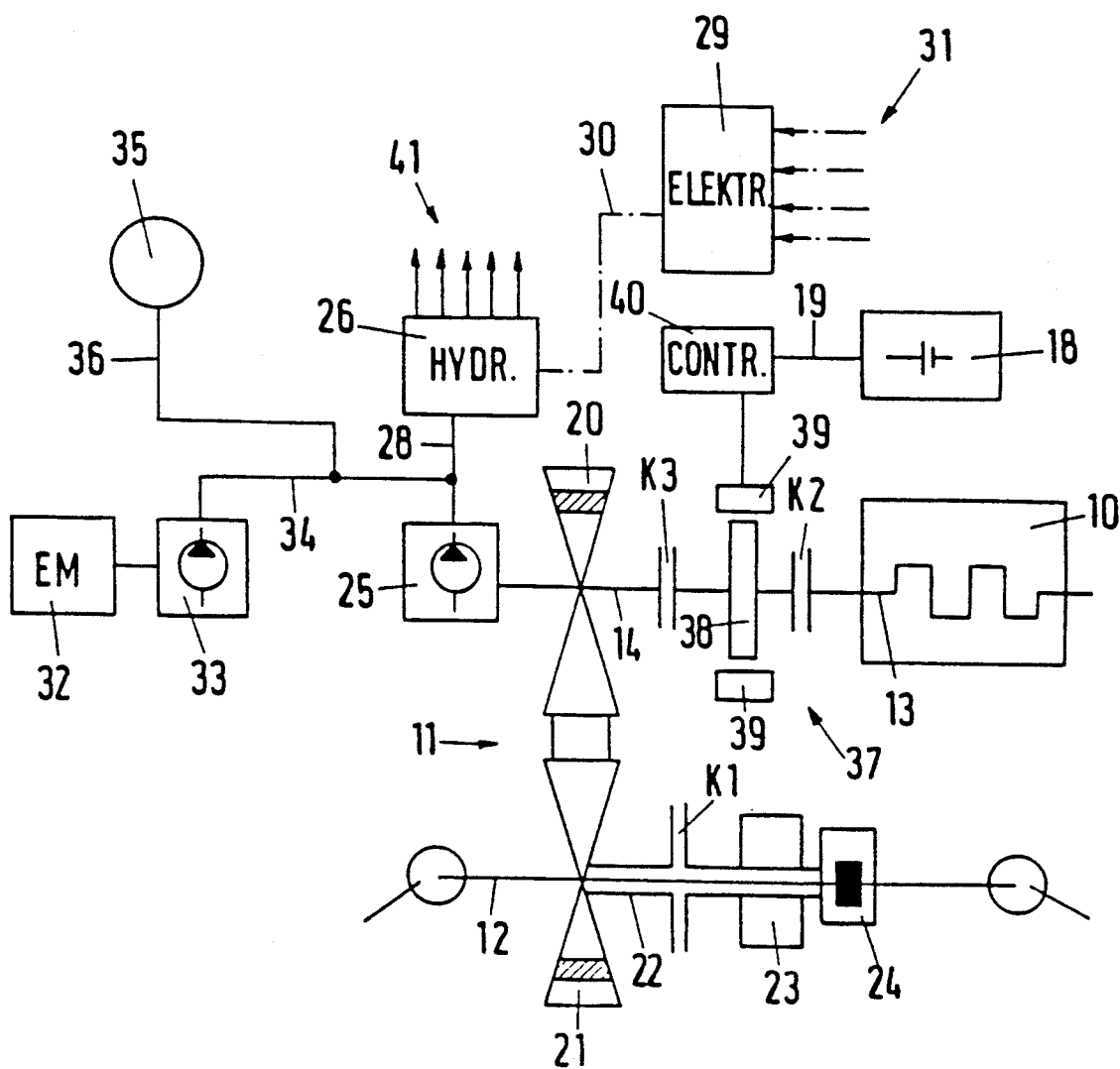
FIG. 2 is a schematic block diagram illustrating another representative embodiment of a drive arrangement according to the invention including an electromechanical converter between the continuously variable transmission and the internal combustion engine and disconnectable therefrom by additional couplings.

Instead of or in addition to the auxiliary pump 33, an oil pressure accumulator 35 connected to the line 34 of the hydraulic system through a line 36 may be provided as shown in FIG. 2. The oil pressure accumulator 35 permits an oil pressure to be supplied to the hydraulic system before start-up of the engine to actuate any switching members, couplings or the like. Check valves (not shown) may be provided in the oil lines downstream of the pumps 25 and 33 and a control valve (not shown) may be provided for the oil pressure accumulator 35.

FIG. 2 also illustrates a variation of the embodiment of FIG. 1. In this case, instead of the flywheel, an electromechanical converter 37 is disposed between the engine 10 and the transmission input shaft 14. A rotor 38 of the converter 37 constitutes a centrifugal mass and is disconnectable from the drive train at the engine side by a coupling K2 and at the transmission side by a coupling K3. The electromechanical converter also includes a stator 39. Preferably, the converter 37 is operable as a motor as well as a generator. To switch between the different operating conditions and to control the flow of electric energy, a control unit 40 is provided in the power line 19 between the battery 18 and the converter 37.

The hydraulic control unit 26 in FIG. 2 also controls the operation of the couplings K2 and K3. Accordingly, five control lines are represented by arrows 41 leading from the control unit.

Depending upon the design of the electromechanical converter 37, various types of operation are possible. In one type of operation, the electromechanical converter 37 is used to start the motor 10 and to generate current in push operation. Starting is facilitated by opening the couplings K2 and K3 so that the rotor 38 can first be accelerated to a speed providing sufficient torque. At the same time, kinetic energy is stored in the centrifugal mass of the rotor. Thereafter, the coupling K2 is closed and the crankshaft 13 engaged. In this embodiment, the converter 37 may be quite small. In this case, it is particularly advantageous for the couplings K2 and K3 to be actuable by a common control element so that the coupling K2 is always closed before closing of the coupling K3.

In another type of operation, the converter 37 is powerful enough to drive the vehicle at low speed in a so-called hybrid operation. In this case, independent actuation of the couplings K2 and K3 is possible.

Elimination of the coupling K3 provides for another type of operation in which the converter acts as either a motor or a generator. In one operating condition, the transmission input shaft 14 and hence the main oil pump 25 can be driven by the converter 37. Because the mechanical resistance of the transmission 11 has to be overcome on starting, this type of operation requires a larger converter 37.

Another type of operation is possible with an arrangement similar to FIG. 2, but omitting the coupling K2. In this case as well, operation of the converter 37 as a motor and as a generator is possible. However, the converter 37 must be powerful enough that it can speed up the motor 10 from standstill to starting speed.

Alternatively, the converter 37 may be omitted and a flywheel driven by the starter may be used in the same way.

Thus, the rotational energy of the flywheel can be stored and used for restarting the engine, especially in conjunction with the couplings K2 and K3, for short-term shutdown and restarting of the engine.

In all of the embodiments described above, opening of the coupling K1 during push operation first produces a vehicle condition in which motion of the vehicle is not retarded by mechanical losses in the transmission. In the embodiment of FIG. 2 using the electromechanical converter 37, braking of the vehicle is first effected by the closing of the coupling K1 and by operation of the converter 37 as a generator. The conventional existing vehicle braking system is used only when this type of braking is not sufficient.

In principle, it is also possible to provide an embodiment without an auxiliary oil pump 33 and without an oil pressure accumulator 35. In this case, starting must be delayed to await a build-up of sufficient hydraulic pressure. Thus, for example, an arrangement similar to FIG. 2 but without the coupling K3 and without the auxiliary oil pump 33 and the oil pressure accumulator 35 is advantageous. In this case, pressure must be produced by the main oil pump 25 before the coupling K1 is actuated by a pressure-responsive signal during starting.

Although the invention has been described herein with reference to specific embodiments, many modifications and variations therein will readily occur to those skilled in the art. Accordingly, all such variations and modifications are included within the intended scope of the invention.

We claim:

1. A drive arrangement for a motor vehicle comprising an internal combustion engine, an automatic transmission on a output side of the engine, flywheel means between the engine and the transmission, at least one drive axle, a disconnect coupling between the transmission and the drive axle, and control means for turning off the engine and opening the disconnect coupling in accordance with driving conditions and for restarting the engine by closing the disconnect coupling.

2. A drive arrangement according to claim 1 wherein the transmission is a continuously variable transmission.

3. A drive arrangement according to claim 1 including a further disconnect coupling between the flywheel means mass and the transmission.

4. A drive arrangement according to claim 1 including a further disconnect coupling between the flywheel means mass and the internal combustion engine.

5. A drive arrangement according to claim 1 including a starter and wherein the flywheel means mass between the internal combustion engine and the transmission constitutes a flywheel which can be driven by a starter.

6. A drive arrangement according to claim 1 including an electromechanical converter between the internal combustion engine and the transmission having a rotor as the flywheel means and a stator.

7. A drive arrangement for a motor vehicle comprising an internal combustion engine, an automatic transmission on the output side of the engine, at least one drive axle, a disconnect coupling between the transmission and the drive axle, control means for turning off and restarting the engine in accordance with driving conditions and to control the disconnect coupling, a centrifugal mass between the internal combustion engine and the transmission, an electromechanical converter between the internal combustion engine and the transmission having a rotor as the flywheel means and a stator and including electrical energy storage means and control means for controlling operation of the electromechanical converter as either a generator or a motor and for controlling direction of flow of electrical energy between the electrical energy storage means and the converter.

8. A drive arrangement according to claim 7 wherein the electromechanical converter constitutes a drive motor for the vehicle.

9. A drive arrangement according to claim 1 including a main oil pump responsive to transmission operation for supplying oil for coupling actuation and an electrically driven auxiliary oil pump for supplying oil for coupling actuation when the engine is off.

10. A drive arrangement according to claim 1 including an oil pressure accumulator to supply oil for coupling actuation when the engine is off.

11. A drive arrangement according to claim 1 wherein the drive axle is a planetary shift axle with an integrated reversing gear.

12. A drive arrangement for a motor vehicle comprising an internal combustion engine, a manual transmission, at least one drive axle, an automatic disconnect coupling between a output side of the transmission and the drive axle, actuating means for the disconnect coupling, control means for turning off the engine and opening the disconnect coupling depending upon a driving condition and for restarting the engine by closing the disconnect coupling, and flywheel means between the engine and the transmission.

* * * * *

UNITED STATES PATENT AND TRADEMARK OFFICE
CERTIFICATE OF CORRECTION

PATENT NO. : 5,168,975
DATED : December 8, 1992
INVENTOR(S) : Bernhardt et al.

It is certified that error appears in the above-identified patent and that said Letters Patent is hereby corrected as shown below:

On the title page, Item [54] and Column 1, line 1, "MOTOR VEHICLE DRIVE ARRANGEMENT" should read --MOTOR VEHICLE DRIVE ARRANGEMENT RESPONSIVE TO OPERATING CONDITIONS--;

Title page, 3rd line of Item 75, "Brunswick" should read --Braunschweig--;

Column 5, line 48, "a output" should read --an output--;

Column 6, line 3, "means mass" should read --means--;

Column 6, line 6, "means mass" should read --means--;

Column 6, line 8, "means mass" should read --means--;

Column 6, line 50, "a output" should read --an output--.

Signed and Sealed this

Fourth Day of January, 1994

Attest:

BRUCE LEHMAN

Attesting Officer

Commissioner of Patents and Trademarks